ated Oct. 17, 1967

3,347,876
AZIDOPENTAPHENYLPHOSPHONITRILE TRIMER
Clay M. Sharts, San Diego, Calif., assignor to the United States of America as represented by the Secretary of the Navy
No Drawing. Filed Oct. 6, 1965, Ser. No. 493,583
1 Claim. (Cl. 260—349)

ABSTRACT OF THE DISCLOSURE

The synthesis of azidopentaphenylphosphonitrile, M.P. 153.5–155.5° C., by reacting $(C_6H_5)_5ClP_3N_3$ with $LiN_3$ in refluxing acetonitrile.

---

The invention herein described may be manufactured and used by or for the Government of the United States of America for governmental purposes without the payment of any royalties thereon or therefor.

This invention relates to polymers and more particularly to preparation of the compound azidopentaphenylphosphonitrile trimer.

This compound is prepared by the reaction of chloropentaphenylphosphonitrile trimer [Inorganic Chemistry, 3, 428 (1964)] with lithium azide in refluxing acetonitrile and has a melting point of 153.5–155.5° C.

The preparation of the starting compound, chloropentaphenylphosphonitrile, is described in the aforementioned publication.

Azidopentaphenylphosphonitrile trimer is an outstanding thermally-stable endcapping compound which is useful in endcapping phosphonitrile polymers derived from diazido compounds and bis-phosphines. It is also useful as a high-temperature blowing agent for generating nitrogen gas.

Polymers containing terminal phosphine groups are not as stable to oxidation as is desirable. It is essential that all terminal phosphine groups be reacted to prevent premature decomposition of the polymers. The compound of this invention is important to producing stable high-temperature polymers derived from bis-phosphines and diazidophosphonitriles. The compound will react with unreacted phosphine linkages and thereby endcap polymers. Endcapping with azidophentaphenylphosphonitrile trimer increases the thermal and chemical stability of such polymers which are useful as laminating agents, coatings, adhesives, and resins.

It is an object of the invention to provide a compound for increasing the thermal and chemical stability of thermally stable polymers.

Another object of the invention is to provide a high temperature blowing agent for generating nitrogen gas.

A further object of the invention is to provide an endcapping compound for phosphonitrile polymers.

Other objects and many of the attendant advantages of this invention will become readily appreciated as the same becomes better understood by reference to the following detailed description.

Azidopentaphenylphosphonitrile trimer, having M.P. 153.5–155.5° C. is prepared by reaction chloropentaphenylphosphonitrile trimer with lithium azide in refluxing acetonitrile. The operation was carried out as described below:

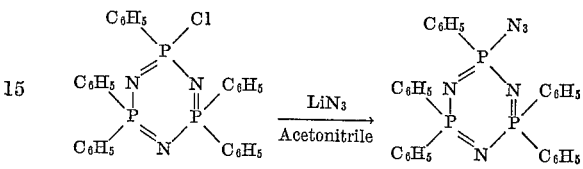

Example 1

In a reaction vessel of 0.235 g. of chloropentaphenylphosphonitrile trimer, 0.100 g. of lithium azide and 30 ml. of acetonitrile were heated 17 hrs. under reflux. Acetonitrile was removed under reduced pressure to give a mixture of solids which were treated with water. After all water soluble material was extracted, the residue was recrystallized from methanol-water to give 0.22 g. of white crystals of M.P. 153.5–155.5° C.

*Analysis.*—Calcd. for $C_{30}H_{25}P_3N_6$: C, 64.06; H, 4.48; P, 16.52; N, 14.49. Found: C, 64.61; H, 4.66; P, 15.91; N, 14.90.

Obviously many modifications and variations of the present invention are possible in the light of the above teachings. It is therefore to be understood that within the scope of the appended claim the invention may be practiced otherwise than as specifically described.

What is claimed is:
The compound of the formula

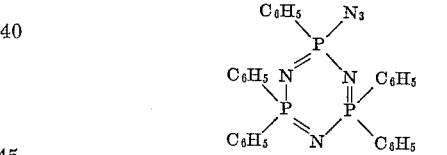

having a melting point of 153.5–155.5° C.

References Cited

Herring: "Inorganic Chemistry," vol. 3, pp. 428–30 (1964).

WALTER A. MODANCE, *Primary Examiner.*
JOHN M. FORD, *Assistant Examiner.*